United States Patent
Kobayashi et al.

(10) Patent No.: US 6,259,666 B1
(45) Date of Patent: Jul. 10, 2001

(54) OPTICAL INFORMATION RECORDING APPARATUS, OPTICAL INFORMATION RECORDING METHOD AND OPTICAL INFORMATION RECORDING MEDIUM

(75) Inventors: Seiji Kobayashi, Kanagawa; Roderick Koehle, Tokyo, both of (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/211,826

(22) Filed: Dec. 15, 1998

(30) Foreign Application Priority Data

Dec. 17, 1997 (JP) .................................................. 9-347532

(51) Int. Cl.$^7$ ........................................................ G11B 7/00
(52) U.S. Cl. ........................ 369/59.11; 369/47.1; 369/116
(58) Field of Search .................................. 369/47, 48, 49, 369/50, 54, 58, 59, 116, 13, 59.11, 59.1, 47.1

(56) References Cited

U.S. PATENT DOCUMENTS 5,323,374 * 6/1994 Arai et al. ............................ 369/116
5,430,696 * 7/1995 Tokita et al. ...................... 369/116 X
5,434,831 * 7/1995 Ishii et al. ............................ 369/13

* cited by examiner

Primary Examiner—Muhammad Edun
(74) Attorney, Agent, or Firm—Frommer Lawrence & Haug, LLP; William S. Frommer; Gordon Kessler

(57) ABSTRACT

An optical information recording apparatus, an optical information recording method and an optical information recording medium according to the present invention enable second information such as character information, graphic information and the like to be recorded on a disk as a large laser output difference, thereby making it possible to record the second information clearly. The optical information recording apparatus comprises a modulation signal generating device (modulating circuit 4) for generating a modulation signal SB which changes in response to first information SA, a time change signal generating device (staircase generating circuit 7) for generating a time change signal SF which changes in accordance with second information SE, a light amount changing device (optical modulator 10A) for changing a light amount of laser beam in accordance with the time change signal SF and an optical modulation device (optical modulator 10B) for turning on and off a laser beam L1 obtained from the light amount changing device 10A in accordance with the modulation signal SB and wherein the light amount of laser beam is changed slowly by the second information SE.

11 Claims, 13 Drawing Sheets

Position Information of Polar Coordinates System

Position Information of Orthogonal Coordinates System

Desired Pattern Drawn on Disk

Pattern Recorded on Memory within Character Signal Generating Ckt.

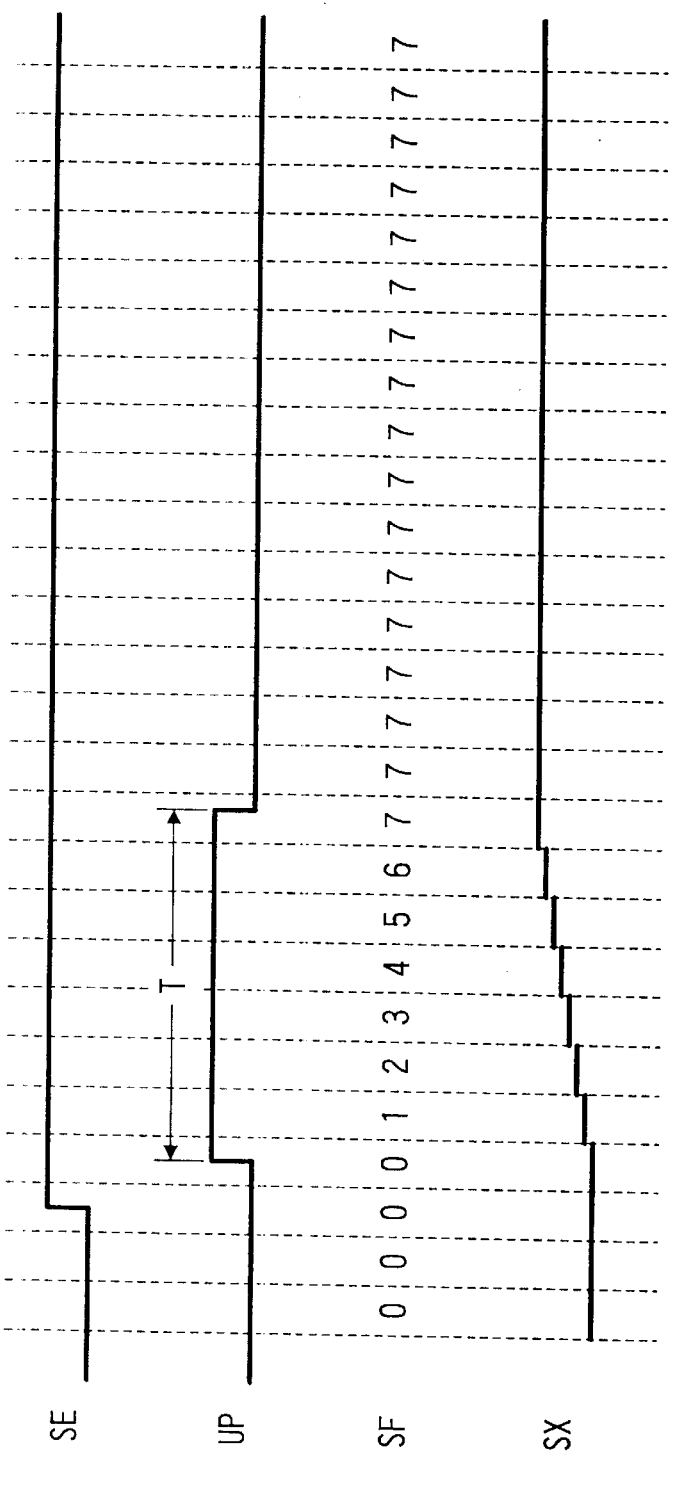

OPTICAL INFORMATION RECORDING APPARATUS, OPTICAL INFORMATION RECORDING METHOD AND OPTICAL INFORMATION RECORDING MEDIUM

BACKGROUND OF THE INVENTION

1. Field of the Invention

The present invention relates to an optical information recording apparatus, an optical information recording method and an optical information recording medium which may be applied to recording apparatus of a compact disc (CD) and a digital video disk (DVD), a recording method of CD and DVD and disks for such CD and DVD, for example. The recording apparatus and the recording method of the present invention may record information such as music information, a video signal or the like on an optical disk by turning on and off a recording laser in accordance with a method standardized in the CD and DVD standardization. At the same time, by gently changing the output of the recording laser, it becomes possible to record on the same disk second information which is not standardized in the CD and DVD standardization.

Also, in the optical information recording medium according to the present invention, there may be recorded new information that may be recognized by visually confirming the disk surface, in addition to the music information and video signal standardized in the CD and DVD standardization, for example.

2. Description of the Related Art

According to the patent application (Japanese patent application No. 8-205292) filed on Jul. 16, 1996 by the same assignee, displacement amounts are obtained from the ideal edge position of the reproduced signal in response to all recorded signal patterns, and the table is formed based on such displacement amounts. By using this table and recording the recording signal while changing the edge position of the recording signal in response to the pattern of the recording signal, it is possible to eliminate the jitter. Thus, it becomes possible to record the second information such as character information, graphic information and so on, which are not contained in the CD standardization, on the signal recording portion of the compact disc (CD) in an superimposing fashion. Further, according to the patent application (Japanese patent application No. 9-67843) filed on Mar. 5, 1997 by the same assignee, an ID (identification) pattern such as a bar code or the like formed by a watermark is recorded on the lead-in or the signal recording portion of the optical disk and such recorded pattern is detected electrically, whereby a disk ID or cipher is read out to thereby prevent the illegal copy or piracy. Furthermore, according to the patent application (Japanese patent application No. 9-298328) filed on Oct. 3, 1997 by the same assignee, there is provided a circuit for transforming polar coordinates of a radius (track number) and a rotation speed (number of FG pulses) indicative of the position in the cutting process into orthogonal coordinates in real time, thereby making it possible to execute the cutting process by using data expressed by the orthogonal coordinates system as they are. Of course, these optical disk apparatus are able to record an EFM (Eight-to-Fourteen Modulation) modulated signal standardized in the compact disc standard in addition to information such as character information and graphic information. Accordingly, the disk thus recorded by the above optical disk apparatus may be reproduced by a conventional player, and also it becomes possible to manufacture a disk in which character and graphic information are recorded on the disk signal portion thereof and in which the value added is improved.

However, according to the above-mentioned conventional method, the second information such as character information, graphic information and so on is recorded as the change of the laser output. As a result, there is then the possibility that signal characteristics will be fluctuated at the boundary portion in which the laser output is changed. Therefore, the laser output could not be changed largely. As a result, there is then the problem that second information such as recorded character information, graphic information and so on is not made clear sufficiently.

SUMMARY OF THE INVENTION

In view of the aforesaid aspect, it is an object of the present invention to provide an optical information recording apparatus and an optical information recording method in which second information such as character information, graphic information or the like recorded on a disk may be recorded as a large laser output difference, thereby making it possible to record clear second information.

It is an object of the present invention to provide an optical information recording medium in which a pit width is changed largely by the second information so that the second information may be visually confirmed more clearly.

According to a first aspect of the present invention, there is provided an optical disk recording apparatus which is comprised of a modulation signal generating device for generating a modulation signal which changes in response to first information, a time change signal generating device for generating a time change signal which changes in accordance with second information in time, a light amount changing device for changing a light amount of the laser beams in accordance with the time change signal, and an optical modulating device for turning on and off the laser beams obtained from the light amount changing device in accordance with the modulation signal. Thus, the laser light amount is changed gently by the second information.

The optical information recording apparatus according to the present invention acts as follows.

The modulation signal generating device generates the modulation signal which changes in response to the first information. The time change signal generating device generates the time change signal which changes in time in accordance with the second information. The light amount change device changes the light amount of the laser in accordance with the time change signal. The optical modulating device turns on and off the laser light or beam obtained from the light amount change device in accordance with the modulation signal. Thus, the laser light amount is changed gently by the second information.

According to a second aspect of the present invention, in the optical information recording apparatus, the modulation signal generating device comprises a first modulation signal generating device for generating a first modulation signal by switching a signal level with a period of an integer multiple of a predetermined fundamental period in response to the first information, a change pattern detecting device for detecting a change pattern of the first modulation signal and a timing correcting device for generating a second modulation signal by correcting a change timing of the first modulation signal in accordance with both of the time change signal and the change pattern mentioned above. The change timing of the recording signal is corrected in response to both of the change of the laser light amount and the change pattern of the recording signal.

According to a third aspect of the present invention, there is provided an optical information recording method in which first information is recorded by mainly turning on and off the laser beam, second information is recorded by mainly changing the light intensity of the laser beam, and the light intensity of the laser beam is changed gently from a time standpoint.

According to the optical information recording method of the present invention, the first information is recorded by mainly turning on and off the laser beam. Also, the second information is recorded by mainly changing the light intensity of the laser beam. Thus, the light intensity of the laser beam is changed gently from a time standpoint.

Further, the timing at which the laser beam is turned on and off is adjusted in accordance with both of the first information and the light intensity of the laser beam.

Also, in the optical information recording medium according to the present invention, the first information is recorded by mainly changing the pit length and the pit position, and the second information is recorded by mainly changing the pit width.

Also, the optical information recording medium of the present invention acts as follows.

The first information is recorded by mainly changing the pit length and the pit position. The second information is recorded by mainly changing the pit width. Thus, the pit width is changed stepwise by the second information.

Furthermore, the pit width is changed stepwise by the second information. Also, the pit length and the pit position are fine adjusted based on the signal pattern recorded as the pit and the pit width.

BRIEF DESCRIPTION OF THE DRAWINGS

FIGS. 6A and 6B are diagrams showing the manner in which coordinates are transformed by the coordinates transforming circuit shown in FIG. 5, wherein FIG. 6A shows position information of polar coordinates system and FIG. 6B shows position information of orthogonal coordinates system, respectively;

FIGS. 7A and 7B are diagrams used to explain an operation of a character signal generating circuit shown in FIG. 1, wherein FIG. 7A is a diagram showing a desired pattern that should be drawn on the disk and FIG. 7B is a diagram showing a pattern that should be recorded on a memory disposed within the character signal generating circuit, respectively;

FIGS. 9A to 9D are timing diagrams used to explain the manner in which the staircase generating circuit shown in FIG. 8 counts an output value in an ascending order, wherein FIG. 9A shows second information SE, FIG. 9B shows an up signal UP, FIG. 9C shows a count value SF, and FIG. 9D shows an analog voltage signal SX, respectively;

FIGS. 10A to 10E are timing diagrams used to explain the manner in which the staircase generating circuit shown in FIG. 8 counts an output value in a descending order, wherein FIG. 10A shows second information SE, FIG. 10B shows a down signal DN, FIG. 10C shows a count value SF, FIG. 10D shows an analog voltage signal SX and FIG. 10E shows a reference clock FK, respectively;

DESCRIPTION OF THE PREFERRED EMBODIMENT

The present invention will now be described in detail with reference to the accompanying drawings.

Figure 1:
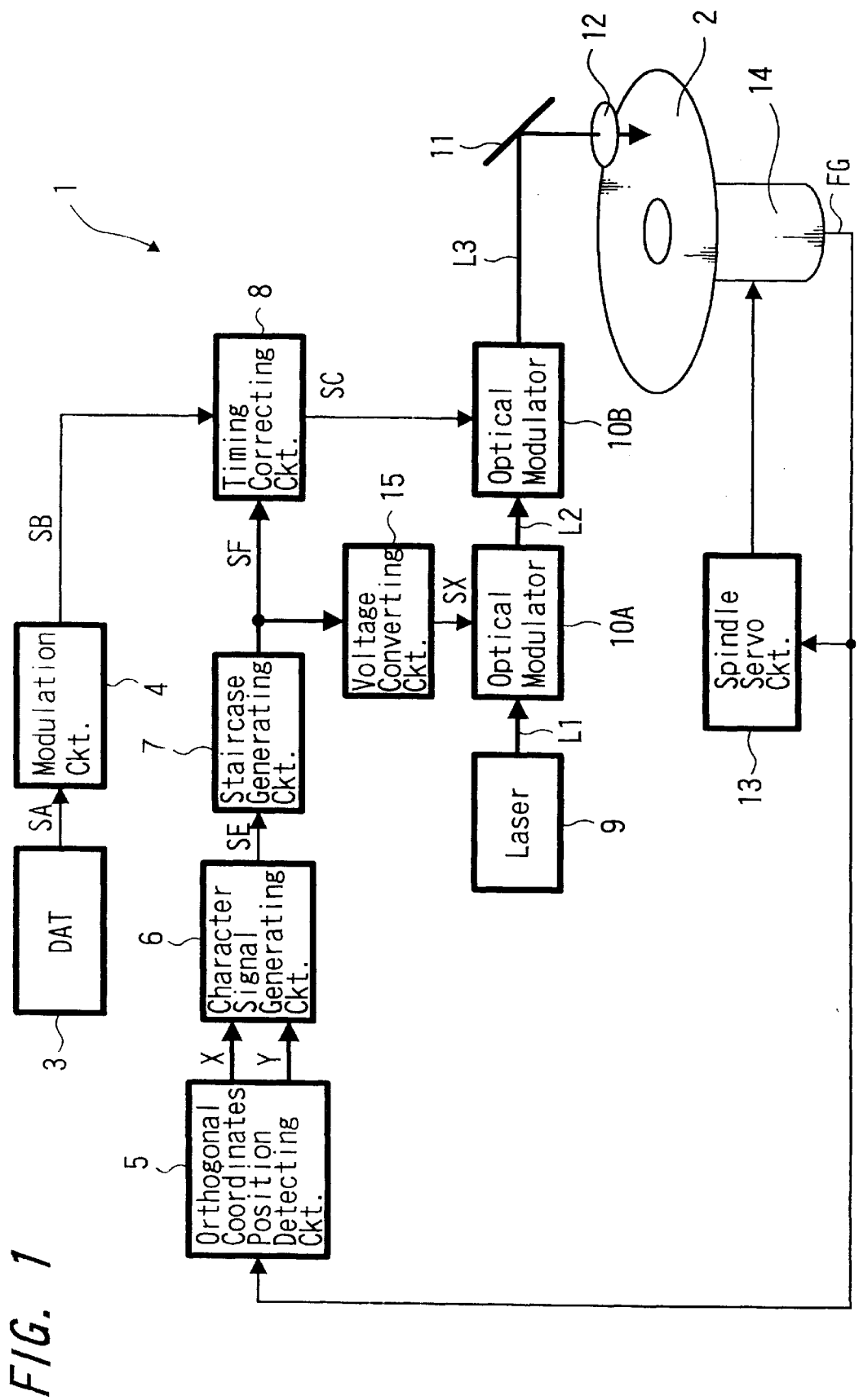
FIG. 1 is a block diagram showing an arrangement of an optical disk apparatus according to an embodiment of the present invention.

FIG. 1 of the accompanying drawings is a block diagram showing an optical recording apparatus 1 according to an embodiment of the present invention. As shown in FIG. 1, this optical disk recording apparatus 1 records audio data SA outputted from a digital audio tape recorder (DAT) 3 after an optical disk master 2 had been exposed. In the optical disk manufacturing process, after this optical disk master 2 was developed, a mother disk is formed by electroplating the developed optical disk master 2, and a stamper is formed from the resultant mother disk. Further, in the optical disk manufacturing process, a disk-like base is formed from the stamper thus made, and a reflecting film and a protecting film are formed on the disk-like base, thereby resulting in a compact disc (CD) being completed.

That is, in this optical disk recording apparatus 1, a spindle motor 14 rotates the optical disk master 2, and an FG signal generating circuit, which is held at the bottom of the spindle motor 14 although not shown, generates an FG signal FG whose signal level rises at every predetermined rotation angle. A spindle servo circuit 13 drives the spindle motor 14 in such a manner that a frequency of the FG signal FG reaches a predetermined frequency, thereby resulting in the optical disk master 2 being rotated at a constant linear velocity (CLV).

The FG signal FG is also supplied to an orthogonal coordinates position detecting circuit 5. The orthogonal coordinates position detecting circuit 5 outputs a position at which information is being recorded as position informations X and Y in the orthogonal coordinates by counting the FG signal FG.

The position informations X and Y are supplied to a character signal generating circuit 6. The character signal generating circuit 6 is formed of a ROM (read-only memory), for example. The character signal generating circuit 6 receives the informations X and Y address inputs and outputs a signal SE. To be more concrete, in response to the present recording position, the character signal generating circuit 6 generates information (second information) of characters and graphic that may be recognized when the disk surface is visually confirmed as the signal SE.

The second informations SE thus obtained is inputted to a staircase generating circuit 7. The staircase generating circuit 7 detects the change of the second information SE, and generates a 3-bit staircase signal SF whose output value changes stepwise with a time. The staircase signal SF is converted by a voltage converting circuit 15 into a signal SX having a staircase-like voltage, and inputted to an optical modulator 10A. Similarly, the staircase signal SF is also inputted to a timing correcting circuit 8.

A recording laser 9 is formed of a suitable laser device such as a gas laser or the like, and emits a laser beam L1 for exposing the disk master. The optical modulators 10A and 10B are each composed of an electroacoustic optical element. The optical modulator 10A changes the output of the laser beam L1 in accordance with the staircase signal SF whose voltage changes in a staircase fashion in response to character and graphic information SE. That is, when the second information SE maintains a level 1 during a long period of time, the optical modulator 10A passes the laser beam L1 such that an output power of a laser beam L2 reaches 100%. Conversely, when the second information SE maintains a level 0 during a long period of time, the optical modulator 10A attenuates and passes the laser beam L1 such that the output power of the laser beam L2 reaches 85%. When the second information SE transitions from the level 0 to the level 1, the optical modulator 10A changes stepwise the laser beam L1 from the power of 85% to the power of 100%. Similarly, when the second information SE transitions from the level 1 to the level 0, the optical modulator 10A changes stepwise the laser beam L1 from the power of 100% to the power of 85%.

As described above, the optical modulator 10A is operated in accordance with the output SF of the staircase generating circuit 7, and outputs the laser beam L2 whose light output fluctuates between 100% and 85%. Then, the laser beam L2 thus obtained is turned on and off by the optical modulator 10B. That is, when a signal SC from the timing correcting circuit 8 is held at the level 1, a laser beam L3 from the optical modulation 10B is turned on. Conversely, when the signal SC is held at the level 0, the laser beam L3 is turned off.

A mirror 11 refracts the light path of this laser beam L3 to convey the laser beam L3 toward the optical disk master 2. An objective lens 12 converges the reflected light of this mirror 11 on the optical disk master 2. The mirror 11 and the objective lens 12 are sequentially translated by a sled mechanism, not shown, in the outer peripheral direction of the optical disk master 2 in synchronism with the rotation of the optical disk master 2, whereby the exposed position of the optical disk master 2 by the laser beam L3 is sequentially displaced in the outer peripheral direction of the optical disk master 2.

Thus, in this optical disk recording apparatus 1, under the condition that the optical disk master 2 is being rotated, a spiral track is formed as the mirror 11 and the objective lens 12 are translated, and pits are sequentially formed on the track in response to the modulation signal SC and the character and graphic information SE.

A modulating circuit 4 receives audio data SA from the digital audio tape recorder 3, and adds corresponding sub-code data to this audio data SA. Further, the modulating circuit 4 generates a modulation signal SB by processing the audio data SA and the sub-code data in accordance with a format of a compact disc. That is, the modulating circuit 4 adds error-correction codes to the audio data SA and the sub-code data, interleaves and EFM-modulates the resultant audio data SA and sub-code data. Thus, the modulating circuit 4 outputs an EFM modulation signal SB whose signal level changes at a period (period 3T to 11T) of an integer multiple of a fundamental period T relative to the pit forming fundamental period T.

In the conventional optical disk recording apparatus, the EFM modulation signal SB thus generated is supplied to the optical modulator 10B as it is, and the optical disk master 2 is exposed by turning on and off the laser beams from the laser 9.

In the disk manufactured by the conventional method, the state of the reproduced signal is changed depending upon the pattern of the recording signal, thus causing a jitter. Specifically, in the disk recorded by the conventional optical disk recording apparatus, there was observed such a phenomenon in which a pit of minimum size corresponding to a 3T signal constantly becomes smaller than an ideal size and then recorded. As a result, having observed a signal from the pit corresponding to the 3T signal after such signal had been binarized by a predetermined slice level, it is to be observed that a pulse width becomes slightly shorter than 3T to cause a jitter.

Further, according to the conventional method, there is then the problem that, when a power of a recording laser is fluctuated, an optimum binarization level in the reproduced signal also is fluctuated. Therefore, as shown in this embodiment, when the laser output power is changed between 100% and 85% in accordance with the character and graphic information SE, a user has to change the binarization level in accordance with the laser output power. When the binarization level in the reproducing apparatus is not changed satisfactorily due to some cause, the conventional system causes an error, and such a recording system is impossible.

Therefore, in this embodiment, the output signal SB of the modulating circuit 4 is supplied to the timing correcting circuit 8. The timing correcting circuit 8 detects the pattern in which the EFM modulation signal SB is changed. At the same time, the staircase signal SF is supplied to the timing correcting circuit 8. Thus, the timing correcting circuit 8 is able to correct a timing in accordance with both of the changing pattern of the recording EFM signal SB and the recording laser beam.

The timing correcting circuit 8 outputs the modulation signal SC whose edge position is fine adjusted in response to both the two kinds of information thus obtained. That is, in the timing correcting circuit 8, the changing timing of the output signal SC is fine adjusted in response to both the recording laser power (value ranging from 85% to 100%) and the changing pattern of the recording EFM signal SB (pattern in which the pit length and the space length are changed in a range of from 3T to 11T) and outputted as the modulation signal SC whose jitter state becomes best constantly.

Specifically, when the modulation signal SC from the timing correcting circuit 8 is recorded by a predetermined laser power expressed by the staircase signal SF and the resultant disk is reproduced, if the reproduced signal is binarized by the predetermined binarization level VL, then there is obtained a signal which does not contain a jitter at all.

The staircase signal SF is the signal produced from the second information SE. The second information SE may be formed as a signal forming characters and graphics when the second information SE, that was recorded on the disc, is visually confirmed. Therefore, in the disk recorded according to this embodiment, the pit width is changed in accordance with the second information SE so that character information and graphic information may be observed by visually confirming the disk surface.

Further, in this embodiment, since the laser power is changed slowly and the timing correcting circuit 8 constantly and properly corrects a timing in response to the changing laser power, any reproducing apparatus becomes able to obtain a reproduced signal without deteriorating a jitter. Also, since the change of the laser power can be made larger than the prior art, it becomes possible to record character and graphic information that can be visually confirmed more clearly on the disc surface.

Further, since the timing correcting circuit 8 constantly corrects a timing all over the recording laser power, there may be removed such a problem that the state of resultant pit becomes different delicately at every pattern. Thus, it is possible to manufacture a disk in which a jitter in a reproduced signal is lowered generally. Furthermore, in this embodiment, since the edge position is adjusted at every recorded pattern, it becomes possible to eliminate a jitter dependent on a pattern, i.e. jitter caused by an intersymbol interference.

Figure 2:
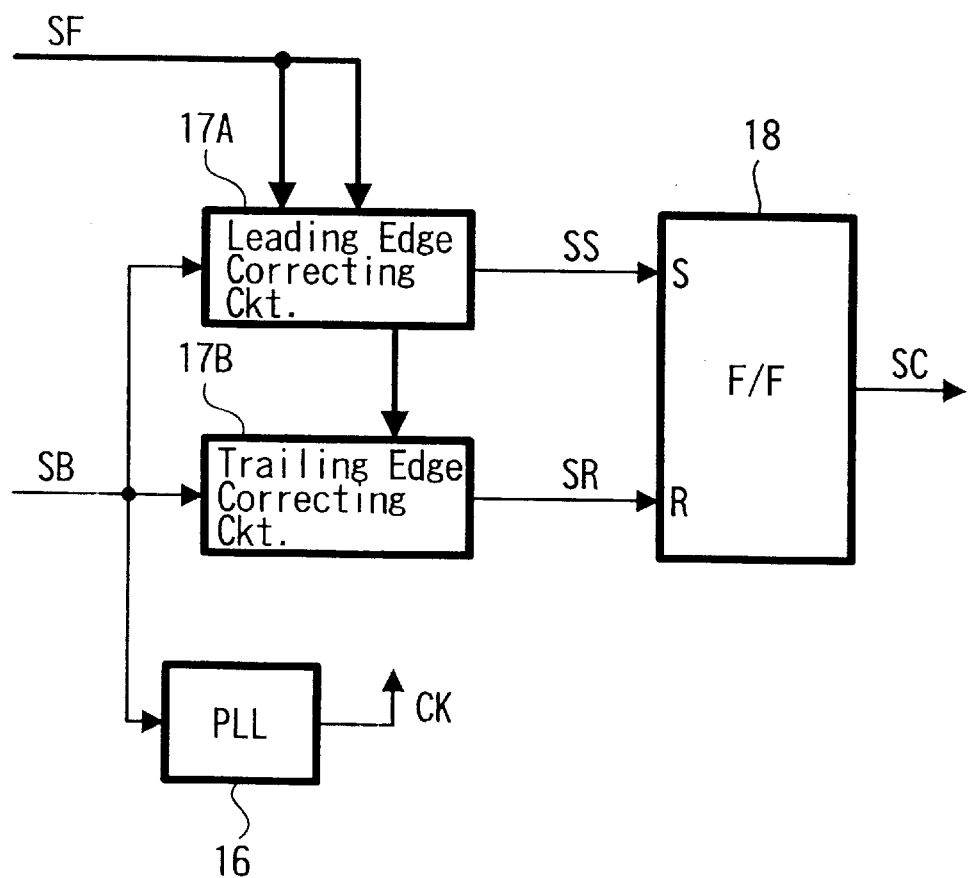
FIG. 2 is a block diagram showing an arrangement of a timing correcting circuit in the optical disk apparatus shown in FIG. 1.

FIG. 2 is a block diagram showing the timing correcting circuit 8 more in detail. In the timing correcting circuit 8, a PLL (phase-locked loop) circuit 16 generates and outputs a channel clock CK from the EFM modulation signal SB. Thus, since the signal level of the modulation signal SB is changed at the period of an integer multiple of the fundamental period T, the PLL circuit 16 generates the channel clock CK whose signal level is changed by the fundamental period T synchronized with this modulation signal SB. Then, the PLL circuit 16 supplies the resultant channel clock CK to a leading edge correcting circuit 17A and a trailing edge correcting circuit 17B.

Figure 3:
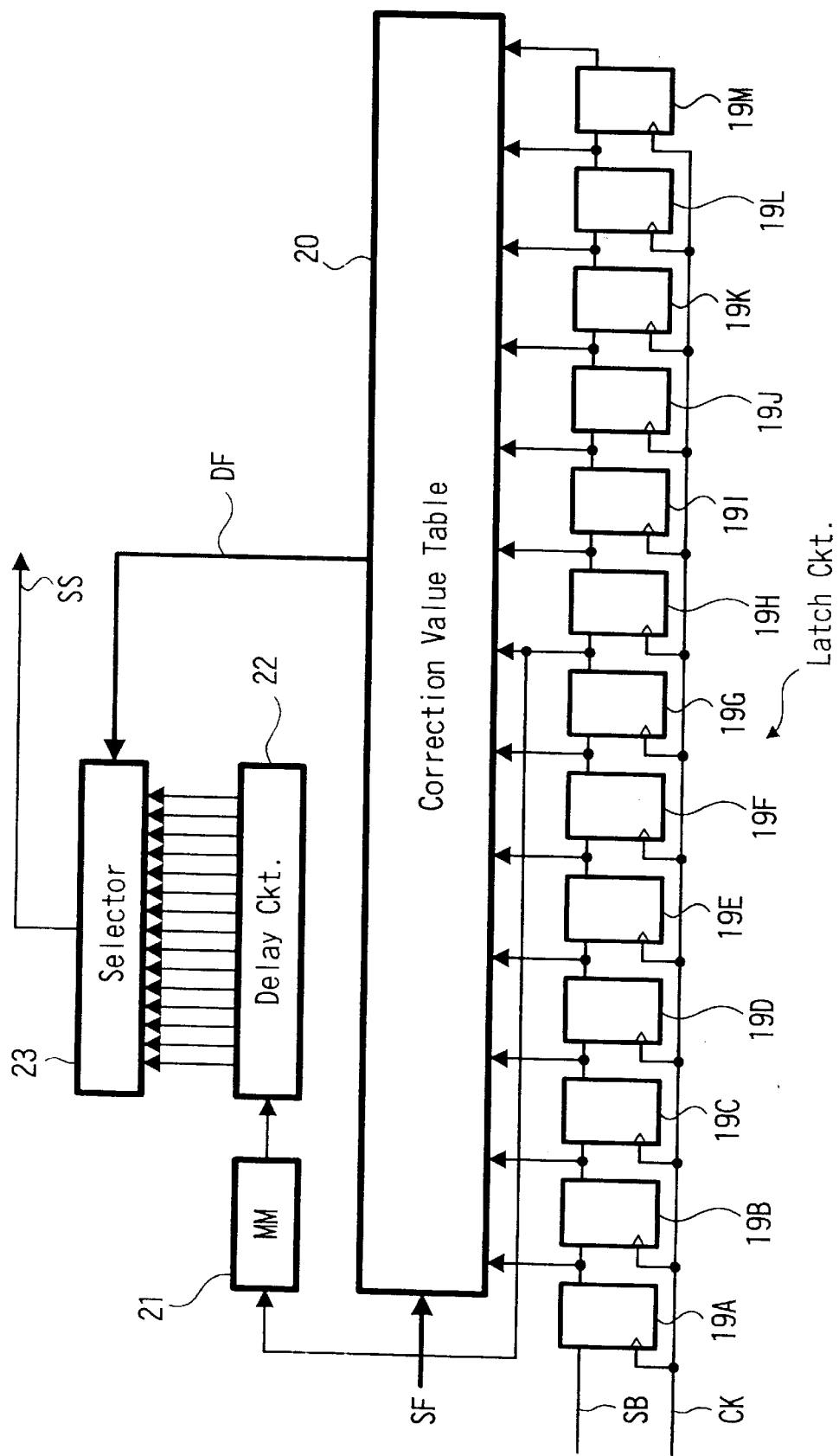
FIG. 3 is a block diagram showing an arrangement of a leading edge correcting circuit in the timing correcting circuit shown in FIG. 2.

In the leading edge correcting circuit 17A, as shown in FIG. 3, 13 latch circuits 19A to 19M which are operated by the clock CK are connected in series, and the EFM modulation signal SB is supplied to this series circuit. Thus, the leading edge correcting circuit 17A samples the EFM modulation signal SB by the timing of the channel clock CK and detects the changing pattern of the EFM modulation signal SB on the basis of the sampled results of consecutive 13 sampling points. That is, when a latch output of "0001111000001", for example, is obtained, it may be judged that the changing pattern comprises a space having a length 5T and a pit having a length 4T continued. Similarly, a latch output of "0011111000001" is obtained, it may be judged that the changing pattern comprises a space having a length 5T and a pit having a length 5T continued.

A correction value table 20 is formed of a ROM (read-only memory) which stores a plurality of correction data. Latch outputs of latch circuits 19A to 19M are inputted to the correction value table 20 as low-order 13 bits of the address. Also, the staircase signal SF is inputted to the correction value table 20 as high-order 3 bits of the address. The staircase signal SF reflects a light intensity of recording laser beam. That is, the correction value table 20 outputs correction value data DF which correspond to both of the changing pattern of the modulation signal SB and the recording power. A monostable multivibrator (MM) 21 receives a latch output from the center latch circuit 19G of the 13 latch circuits 19A to 19M connected in series, and outputs on the basis of the timing at which this latch output rises a leading pulse signal whose signal level rises during a predetermined period (period sufficiently shorter than the period 3T).

A delay circuit 22 has tap outputs of 15 stages, and a delay time difference between the taps is set to a timing correction resolution of the modulation signal in the edge position correcting circuit 17A. The delay circuit 22 sequentially delays the leading pulse signal outputted from the monostable multivibrator 21 and outputs delayed signals from the respective taps. A selector 23 selectively outputs the tap outputs of the delay circuit 22 in accordance with correction value data DF, and selectively outputs a leading pulse signal SS whose delay time is changed in response to the correction value data DF.

That is, the leading edge correcting circuit 17A generates the leading signal SS whose signal level rises in response to the leading of the signal level of the EFM modulation signal SB and in which the delay time of each leading edge corresponding to the EFM modulation signal SB is changed in response to the changing pattern of the EFM modulation signal SB and the recording laser power.

As described above, the leading edge correcting circuit 17A detects the pattern of the pit formed on the optical disk and the recording laser power with respect to the range of the period 12T in which the fundamental period T is used as the unit. Then, the leading edge correcting circuit 17A generates the leading edge signal SS in response to the recording pattern and the recording laser power.

A trailing edge correcting circuit 17B differs from the leading edge correcting circuit 17A only in that the monostable multivibrator 21 is operated based on the trailing edge of the latch output and the content of the correction value table 20 is different.

That is, the trailing edge correcting circuit 17B detects the pattern of the pit formed on the optical disk and the recording laser power with respect to the range of the period 12T in which the fundamental period T is used as the unit. Then, the trailing edge correcting circuit 17B corrects the timing of the trailing edge of the modulation signal SB comprising the laser beam irradiation end timing in response to the pattern and the power and generates a trailing edge signal SR.

A flip-flop (F/F) circuit 18 shown in FIG. 2 synthesizes the leading edge signal SS and the trailing edge signal SR and outputs a synthesized output signal. That is, the flip-flop circuit 18 receives the leading edge signal SS and the trailing edge signal SR at its set terminal S and reset terminal R respectively, and generates a modulation signal SC whose signal level falls at the leading edge of the signal level of the trailing edge signal SR after the signal level rose at the leading edge of the signal level of the leading edge signal SS.

Thus, the EFM modulation signal SB is outputted as the signal SC in which the timings of the leading edge and the trailing edge are corrected in response to the recording pattern (determined by the pit length and the space length) and the recording power.

On the basis of the thus obtained output signal SC from the timing correcting circuit 8, the laser beam L2 whose output level changes between 100% and 85% is turned on/off by the optical modulator 10B and irradiated on the optical disk master 2 as the laser beam L3.

Figure 4:
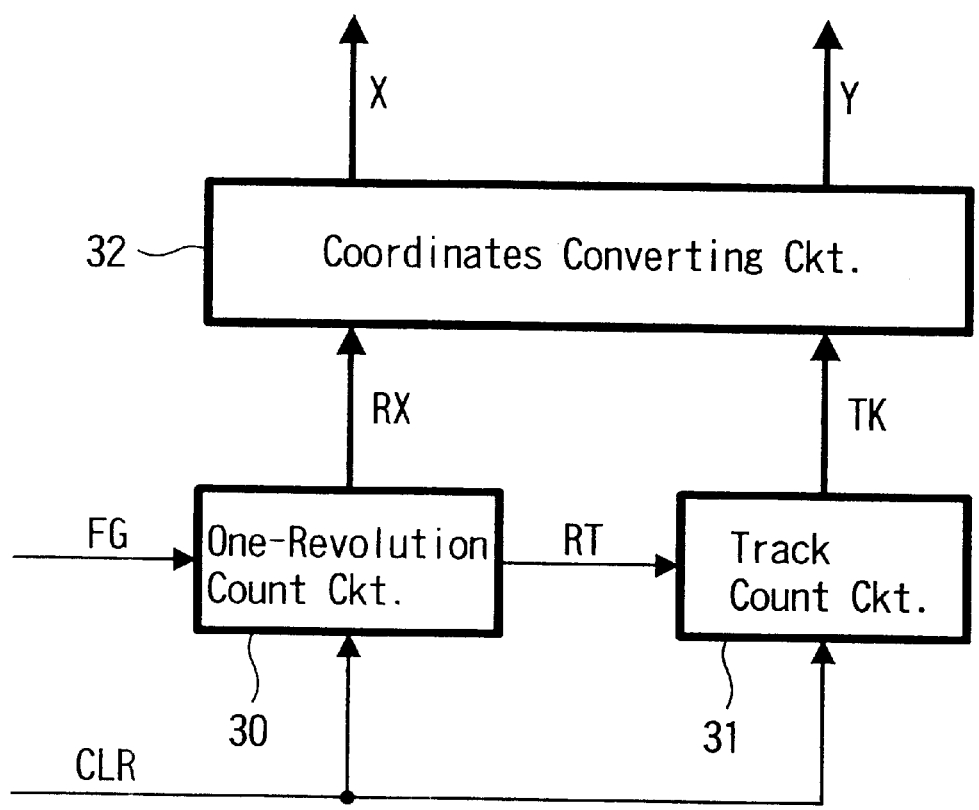
FIG. 4 is a block diagram showing an arrangement of an orthogonal coordinates position detecting circuit in the optical disk recording apparatus shown in FIG. 1.

FIG. 4 is a block diagram showing an arrangement of the orthogonal coordinates position detecting circuit 5 used when the second information SE thus recorded is reproduced. As shown in FIG. 4, a one-revolution count circuit 30 and a track count circuit 31 are cleared by a clear pulse CLR from a system controller (not shown) and initial values thereof are set to zero when the recording is started. The spindle motor 14 generates 4200 pulses as the FG signal FG each time the spindle motor 14, for example, rotates once.

This pulse is counted 4200 times by the one-revolution counter 30, and then outputted as a count value RX. This count value RX ranges from 0 to 4199 and is incremented each time the spindle motor 14 rotates 1/4200, thereby representing a rotation angle of the spindle motor 14. Also, when the spindle motor 14 rotates once, this one-revolution counter 30 is reset. Each time the one-revolution counter 30 is reset, a pulse is generated as a signal RT, and this pulse is inputted to the track counter 31.

The track count circuit 31 outputs a track number TK, which is being recorded at present, by counting the signal RT of one pulse per revolution. When the compact disc, for example, is recorded, the recording is started from a radius 23 mm and ended with a radius 58 mm by a track pitch of 16 microns so that the value of the track count circuit 31 changes from 0 to about 22000 counts.

As described above, the count value RX of the one-revolution count circuit 30 and a count value TK of the track count circuit 31 correspond to angle information and radius information obtained when the present recording position is expressed by polar coordinates. Accordingly, a coordinates transform circuit 32 is able to calculate and output position informations X and Y in the orthogonal coordinates system by using the two values RX and TK. The position informations X and Y of the orthogonal coordinates system are thus transformed and then supplied to the character signal generating circuit 6.

Figure 5:
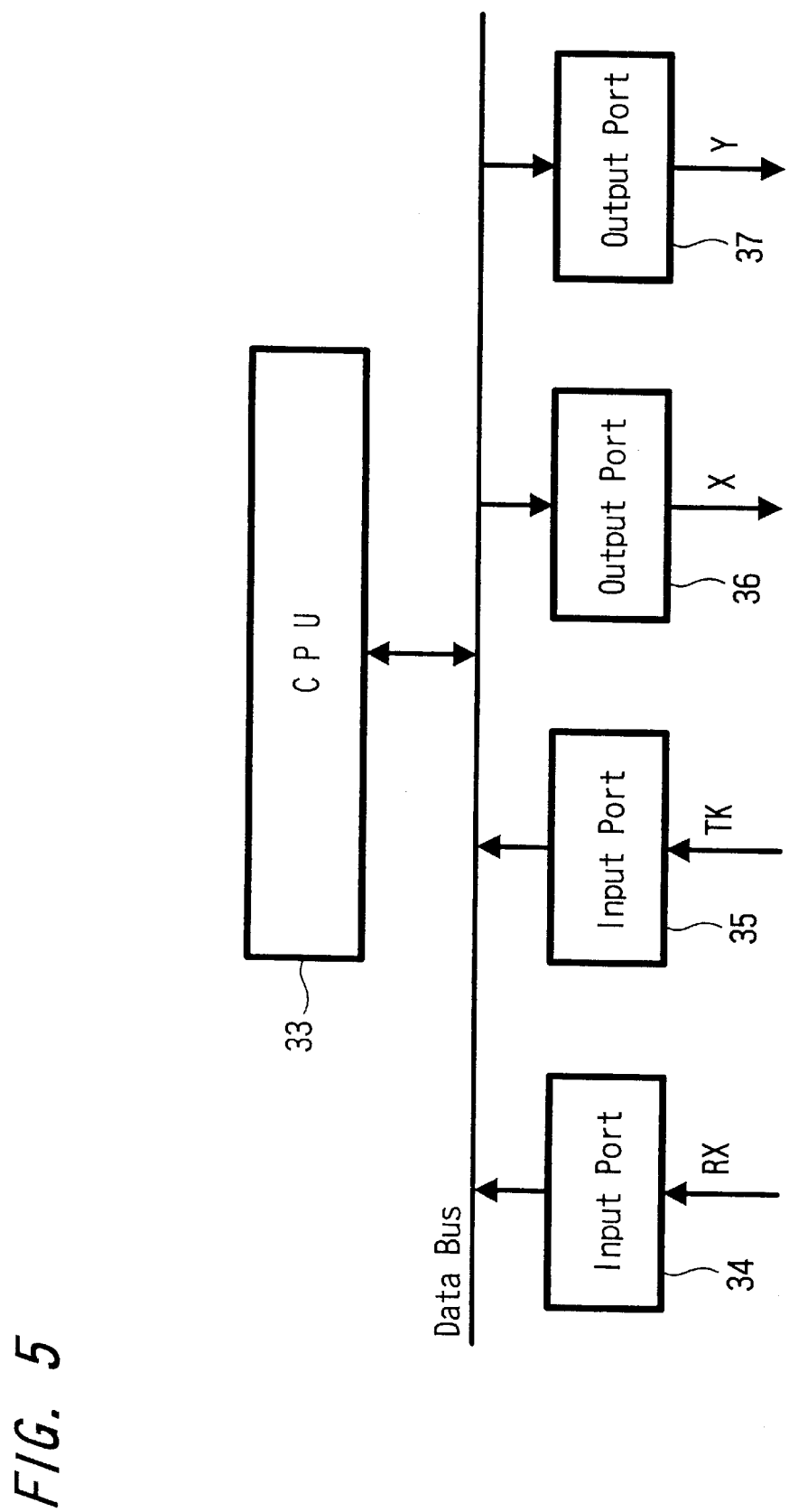
FIG. 5 is a block diagram showing an arrangement of a coordinates transforming circuit in the orthogonal coordinates position detecting circuit shown in FIG. 4.

The orthogonal coordinates position detecting circuit 5 is realized as shown in FIG. 5, for example. As shown in FIG. 5, input 34 and 35 ports are connected to a CPU (central processing unit) 33 and output ports 36 and 37 are also connected to the CPU 33 at the same time. The count values RX and TK of the one-revolution count circuit 30 and the track count circuit 31 are connected to the input ports 34 and 35, respectively, and the CPU 33 may latch these values RX and TK.

The CPU 33 calculates the position informations X and Y of the orthogonal coordinates system from these two count values RX and TK in accordance with the following equations (1) and (2), and outputs the thus obtained position informations X and Y to the output ports 36 and 37:

$$X = A \cdot (TK \cdot Tp + Tb) \cdot \cos(2\pi \cdot (RX/4200)) + B \quad (1)$$

$$Y = A \cdot (TK \cdot Tp + Tb) \cdot \sin(2\pi \cdot (RX/4200)) + B \quad (2)$$

Figure 6A:
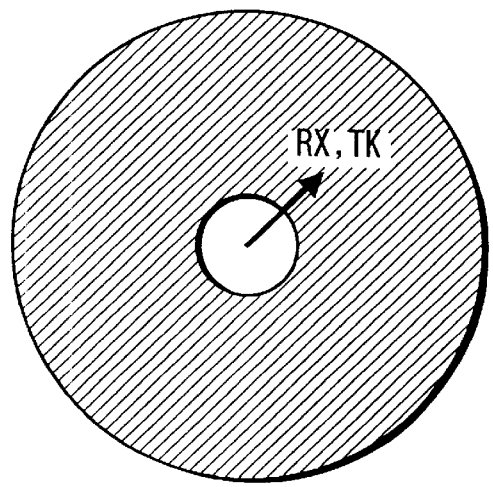
Figure 6B:
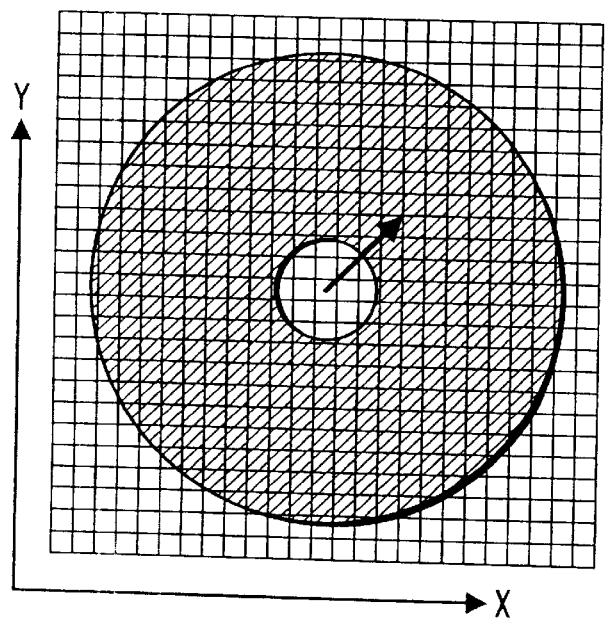

In the above-mentioned equations (1) and (2), A and B represent constants determined by the magnitude and position of the coordinates system, Tb represents the radius from which the recording is started, and Tp represents the track pitch. As a result of the above-mentioned transformation, position information expressed by a polar coordinates system (RX, TK) shown in FIG. 6A is transformed into an orthogonal coordinates system (XY) shown in FIG. 6B.

Figure 7A:
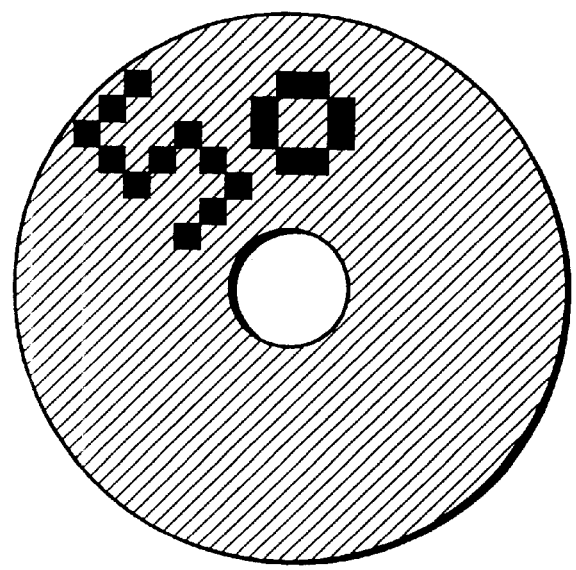
Figure 7B:
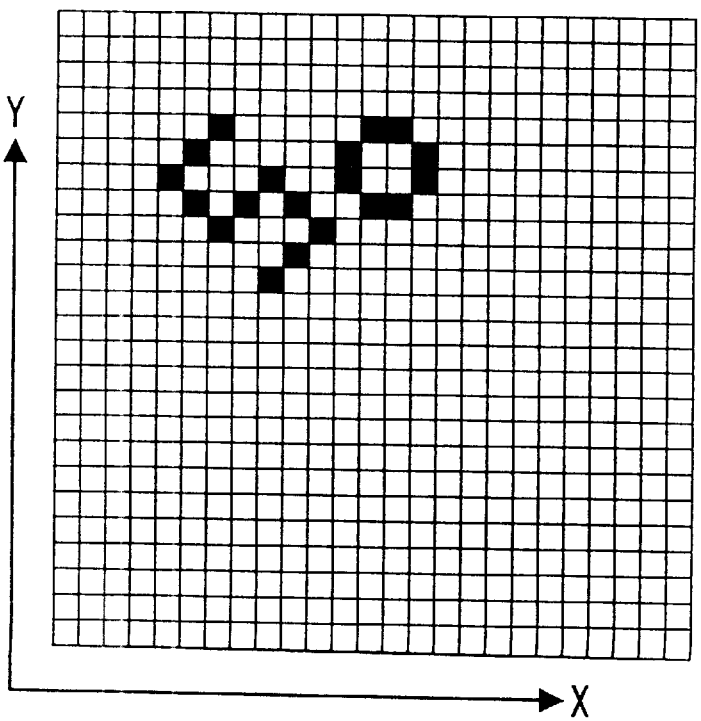

Referring back to FIG. 1, the character signal generating circuit 6 is formed of a ROM (read-only memory) or the like, and outputs memory outputs as character and graphic information SE in response to outputs (X, Y) of the orthogonal coordinates position detecting circuit 5 supplied thereto as address inputs. When a desired pattern shown in FIG. 7A, for example, is drawn on the disk, a pattern shown in FIG. 7B is recorded on the memory incorporated within this character signal generating circuit 6.

As described above, a desired drawing image is binarized by using the orthogonal coordinates system and recorded on the ROM incorporated within the character signal generating circuit 6. Since the coordinates system of the information recorded on this ROM is transformed in real time by the orthogonal coordinates position detecting circuit 5 and then inputted, such information is read out as it is and sequentially recorded on the disk as the change of the recording laser power. However, when the output of the character signal generating circuit 6 is changed from the level 0 to the level 1 or from the level 1 to the level 0, the staircase generating circuit 7 generates the staircase waveform SF in order to make such change become gentle.

Figure 8:
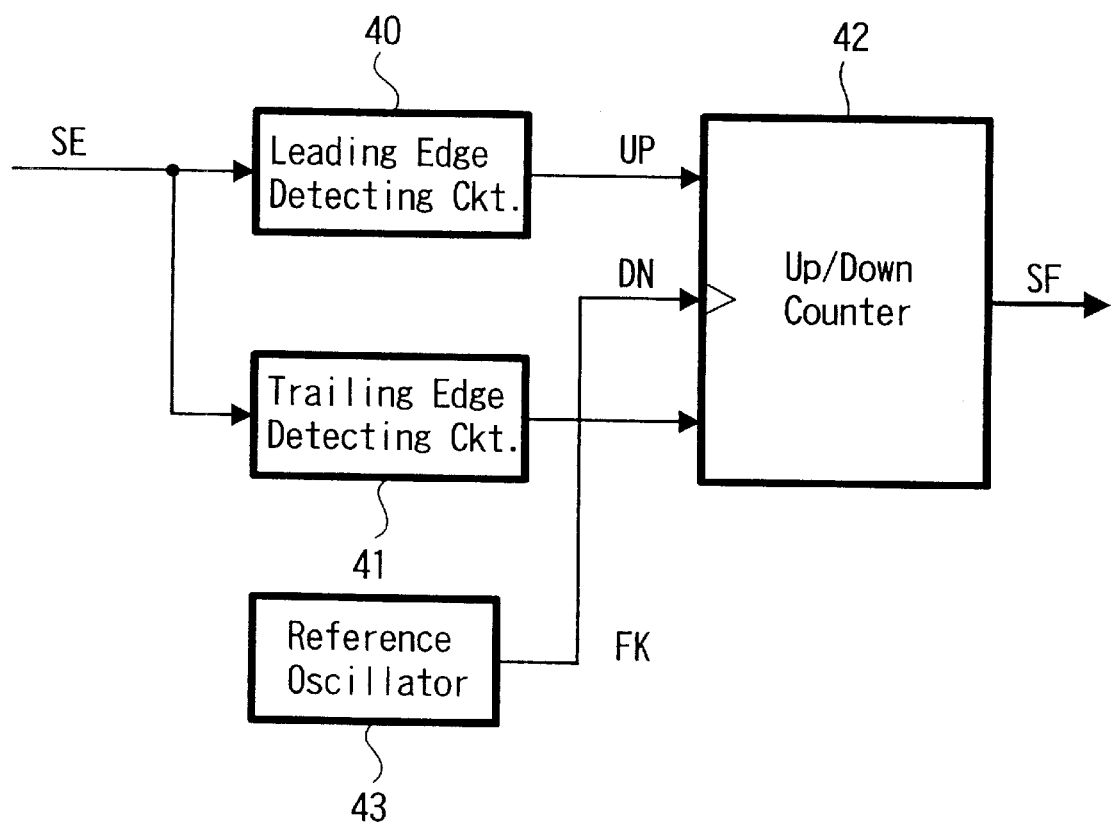
FIG. 8 is a block diagram used to explain an arrangement of a staircase generating circuit shown in FIG. 1.

FIG. 8 is a block diagram showing an arrangement of the staircase generating circuit 7. As shown in FIG. 8, the change of the second information SE from the level 0 to the level 1 is detected by a leading edge detecting circuit 40 and supplied to an up/down counter 42 as a signal whose level is held at "1" during a constant period of time. During the up signal input UP is held at the level "1", the up/down counter 42 counts a reference clock FK from a reference oscillator 43 and counts the output value SF in the ascending order. Also, the change of the second information SE from the level 1 to the level 0 is detected by a trailing edge detecting circuit 41 and supplied to the up/down counter 42 as a signal DN whose level is held at "1" during a constant period of time. During the down signal DN is held at the level "1", the up/down counter 42 counts the reference clock FK from the reference oscillator 43 and counts the output value SF in the descending order. The leading edge detecting circuit 40 and the trailing edge detecting circuit 41 which are operated as described above may be formed of a suitable device such as a monostable multivibrator or the like.

An example of the operation of the above-mentioned staircase generating circuit 7 will be described with reference to FIGS. 9A to 9D and FIGS. 10A to 10E. When the leading edge of the second information SE shown in FIG. 9A is produced, the leading edge detecting circuit 40 outputs a pulse UP which is held at the level "1" during a time period T shown in FIG. 9B. The up/down counter 42 counts the pulse at the period of the reference clock FK shown in FIG. 10E in the ascending order, and sequentially increments the count value SF from 0 to 7. Although not shown, the up/down counter 42 is inhibited from counting the pulse in the ascending order in order to prevent an overflow when its count value reaches 7.

Figures 10A, 10B, 10C, 10D, 10E:
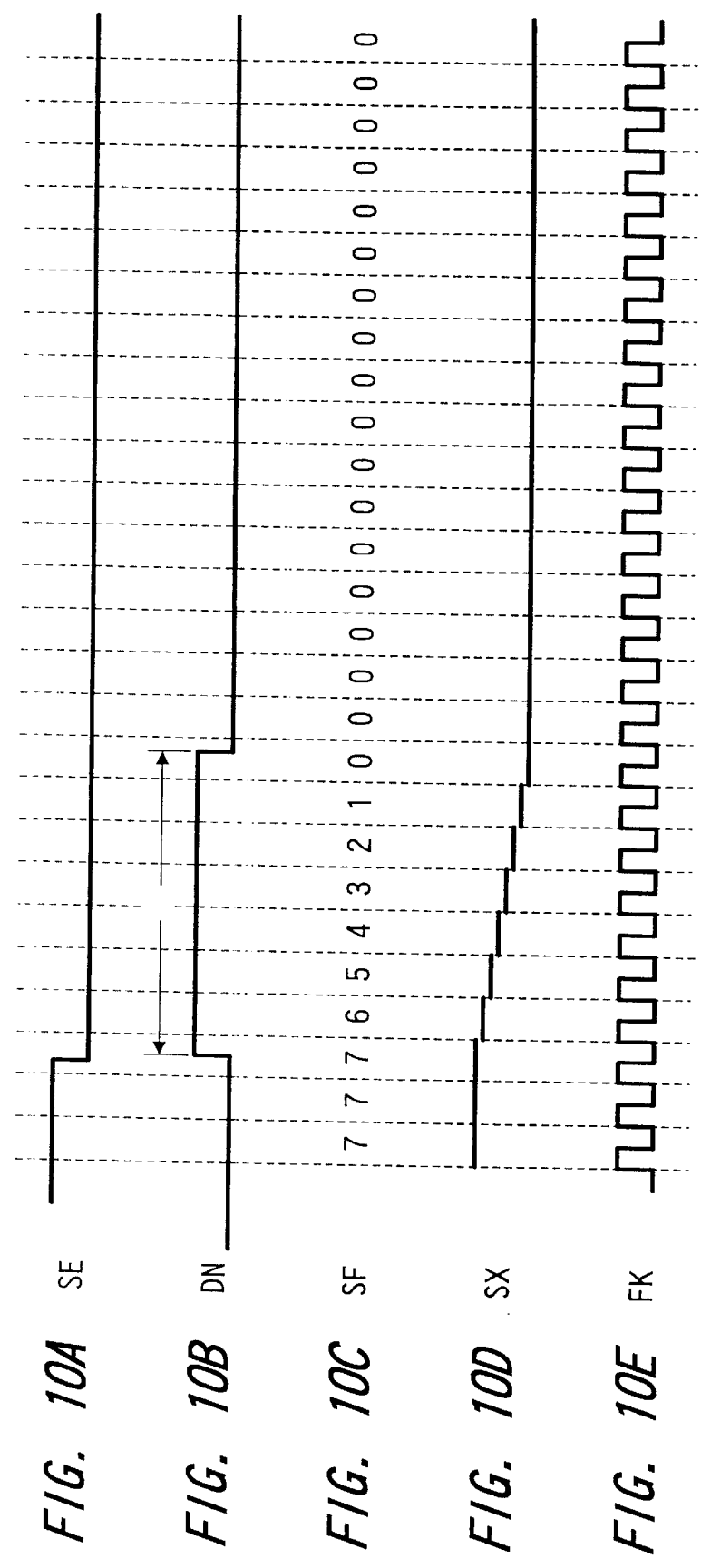

Also, when the trailing edge of the second information SE shown in FIG. 10A is produced, the trailing edge detecting circuit 41 outputs a pulse UP shown in FIG. 10B. In this case, the up/down counter 42 counts the pulse at the period of the reference clock FK shown in FIG. 10E in the descending order, and sequentially decrements its count value SF from 7 to 0 as shown in FIG. 10C. Although not shown, the up/down counter 42 is inhibited from counting the pulse in the descending order in order to prevent an underflow when its count value reaches 0.

As described above, the up/down counter 42 outputs the staircase signal SF whose value is sequentially changed from 0 to 7 in accordance with the change of the second information SE. Such staircase signal SF is converted by the voltage converting circuit 15 shown in FIG. 11 into the analog voltage SX which controls the optical modulator 10A. The signal SX converted into the analog voltage becomes a staircase waveform whose value is changed a little near the changing point of the second information SE as shown in FIG. 9D or 10D, for example.

Figure 11:
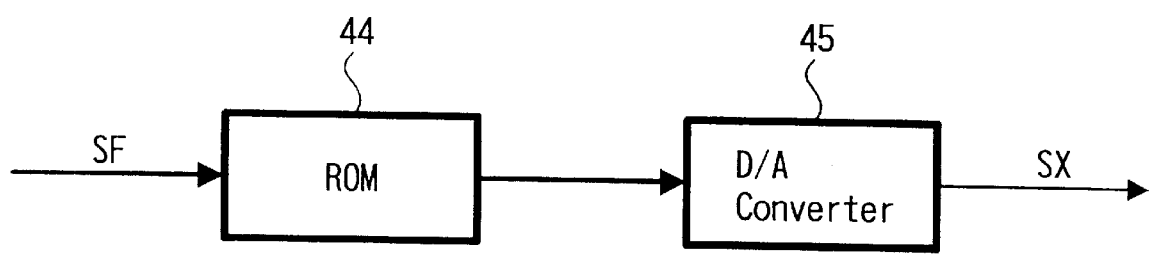
FIG. 11 is a block diagram showing an arrangement of a voltage converting circuit shown in FIG. 1.

To the voltage converting circuit 15 shown in FIG. 11, there is supplied the staircase signal SF as an address signal of the read-only memory (ROM) 44. The laser recording power corresponding to the staircase signal SF ranging from 0 to 7 is previously calculated and recorded in the inside of the ROM 44. An example in which the laser power is changed from 100% to 85% as described in the first half of this embodiment will be described as the simplest example. When the value of the staircase signal SF is 7, for example, the laser power of 100% is expected so that a numerical value 100 is recorded in response to the address 7. When the staircase signal SF is 0, the laser power of 85% is expected so that a numerical value 85 is recorded. Then, when the staircase signal SF ranges from 1 to 6, a value calculated from a proportional distribution between 100 and 85 is recorded.

The above-mentioned example is the simplest case obtained by assuming that the laser power of 100% is outputted when the output of the ROM 44 is 100. In actual practice, considering a conversion gain of a D/A (digital-to-analog) converter 45 and a conversion factor of the optical modulator 10A, a value that is recorded on the ROM 44 should be determined. Further, the laser output power and the input voltage to the optical modulator 10A are not always placed in a linear relationship. In such case, values which are varied properly should be recorded on the ROM 44.

The laser output value read out from the ROM 44 as described above is converted by the D/A converter 45 into the analog voltage value SX and supplied to the optical modulator 10A, thereby resulting in the output power of the laser 9 being controlled. In the laser beam L2 thus obtained, the change of its output power is the stepwise change obtained in accordance with the staircase signal SF (see FIGS. 9D and 10D).

Figure 12:
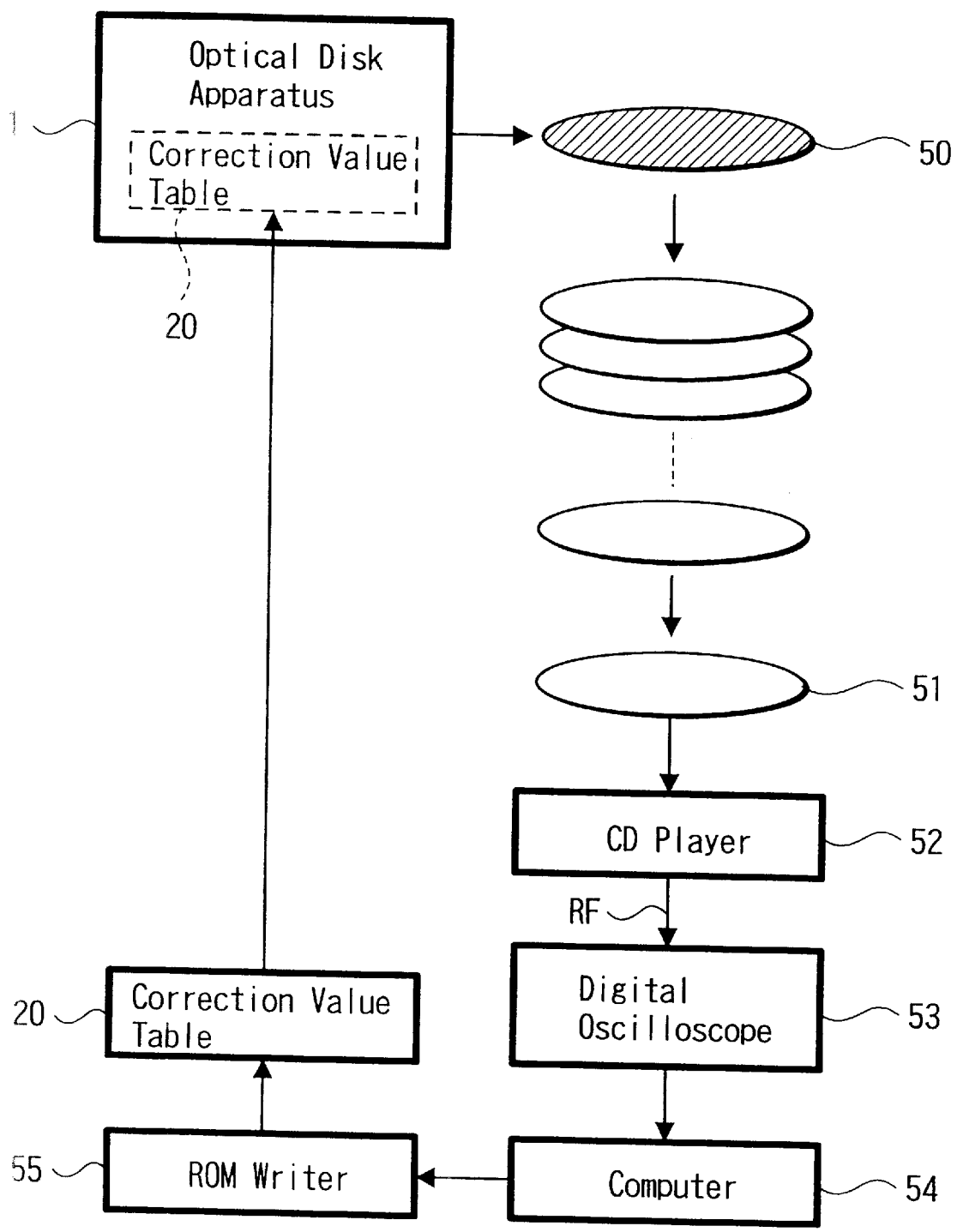
FIG. 12 is a process diagram showing a process for making a correction value table in the optical disk apparatus shown in FIG. 1.

FIG. 12 is a process diagram used to explain the manner in which the correction value table 20 used to correct the edge timing is generated. The correction value table 20 exists both in the leading edge correcting circuit 17A and the trailing edge correcting circuit 17B. If these tables are set correctly, even when the recording laser power is changed in accordance with the graphic and character information SE, it becomes possible to manufacture a disk in which a reproduced signal crosses a predetermined slice level at a correcting timing synchronized with the clock CK (i.e. disk whose jitter amount is small).

These correction value tables 20 are generated by the same method excepting that the conditions under which these correction value tables 20 are generated are different. Accordingly, only the leading edge correcting circuit 17A will be described below.

In the process which will be described below, an evaluation disk master is manufactured by the optical disk apparatus 1, and the correction value table 20 is set based on the reproduced result of the compact disc manufactured by using this optical disk master.

When the evaluation disk master is manufactured, the evaluation reference correction value table 20 is set in the optical disk apparatus 1. Correction value data DF is set in this evaluation reference correction table 20 such that the selector 23 shown in FIG. 3 always selects and outputs the center tap output of the delay circuit 22. Thus, in this process, the effect of the timing correcting circuit 8 is set in the disabled state.

In this manner, the signal SC in which the effect of the timing correcting circuit 8 is disabled is supplied to the optical modulator 10B, and the optical disk master 2 is exposed by the laser beam L2 of 100% power similarly to the process in which the ordinary compact disc is manufactured.

After the exposed optical disk master 2 is developed, a mother disk is produced by electroplating the developed optical disk master 2, and a stamper 50 is manufactured from this mother disk. Further, a compact disc 51 is manufactured from the stamper 50 similarly to the process in which the ordinary compact disc is manufactured.

Referring to FIG. 12, a CD player 52 reproduces the thus made evaluation compact disc 51 in accordance with the instruction from a computer 54. At that time, the CD player 52 switches its operation under control of the computer 54 and outputs a reproduced RF signal whose signal level is changed in response to a light amount of returned light obtained from the compact disc 51 from a signal processing circuit incorporated therein to a digital oscilloscope 53.

At this stage, the binarized level of the reproduced signal is not always a predetermined one similarly to the ordinary compact disc. Further, since the pits are not formed completely ideally, it is unavoidable that a jitter is observed.

The digital oscilloscope 53 A/D (analog-to-digital)-converts this reproduced RF signal by a sampling frequency 20 times as high as the channel clock, and outputs a resultant digital signal to the computer 54.

The computer 54 controls the operations of the CD player 52 and the digital oscilloscope 53, and also processes the digital signal outputted from the digital oscilloscope 53 and calculates the correction value data DF thereby.

The computer 54 drives a ROM writer 55 and sequentially stores calculated correction value data DF in the read-only memory, thereby resulting in the correction value table 20 being formed. An optical disk is finally manufactured by the thus completed correction value table 20.

Figure 13:
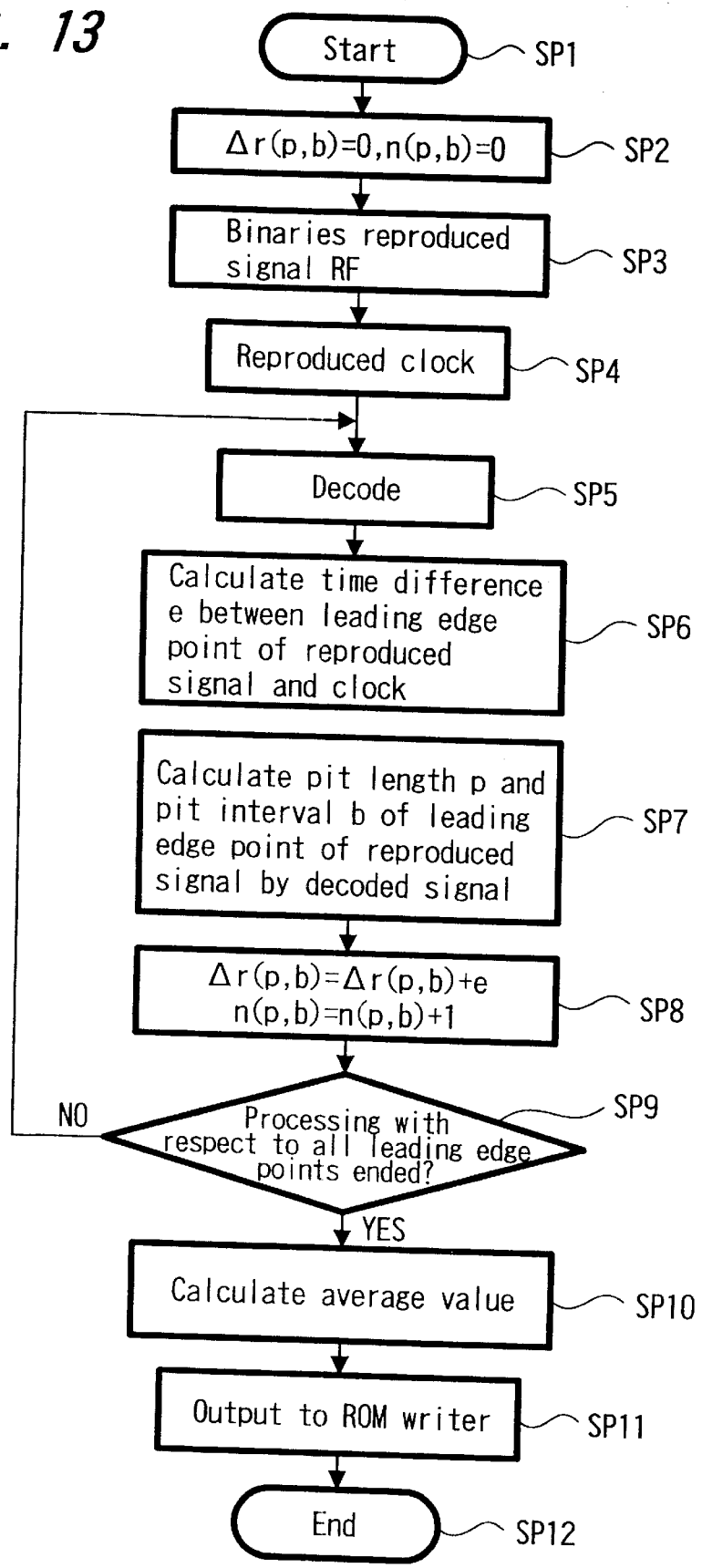
FIG. 13 is a flowchart showing a procedure executed by a computer in the process shown in FIG. 12.

FIG. 13 is a flowchart showing a procedure in which the correction value data DF is manufactured in this computer 54. In this procedure, referring to FIG. 13, control of the computer 54 goes from a step SP1 to a step SP2, wherein a jitter detection result $\Delta r$ (p, b) and an a jitter measurement number n (p, b) are set to values 0. The computer 54 computes the jitter detection result $\Delta r$ (p, b) with respect to the front and rear of the edge from which the jitter is to be detected at every combination of the pit length p and the pit interval b. Also, the computer 54 counts the jitter measurement number n (p, b). To this end, the computer 54 sets all jitter detection result $\Delta r$ (p, b) and the jitter measurement number n (p, b) to initial values at the step SP2.

Subsequently, control of the computer 54 goes to a step SP3, wherein the computer 54 generates a digital binarized signal which results from binarizing the reproduced signal RF by comparing the digital signal outputted from the digital oscilloscope 53 with a predetermined slice level VL. Incidentally, in this processing, the computer 54 binarizes the digital signal such that the digital signal is held at the value "1" when the digital signal is higher than the slice level and it is held at the value "0" when the digital signal is less than the slice level.

Subsequently, control of the computer 54 goes to a step SP4, wherein a reproduced clock is generated from the binarized signal formed of this digital signal. The computer 54 simulates the operation of the PLL circuit by the computation process based on the binarized signal, thereby resulting in the reproduced clock being generated.

Further, in the next step SP5, the computer 54 samples the binarized signal at the timing of each trailing edge of the thus generated reproduced clock, thereby resulting in the modulation signal being decoded (hereinafter this decoded modulation signal will be referred to as a decoding signal).

Subsequently, control of the computer 54 goes to a step SP6, wherein the computer 54 detects a time difference e from the timing point of the leading edge of the binarized signal to the timing point of the trailing edge of the reproduced clock closest to this edge, thereby measuring the jitter in this edge. Subsequently, in the next step SP7, the computer 54 detects the pit lengths p and the pit intervals b ahead of and behind this decoding signal with respect to the edge measured at the step SP6.

In the next step SP8, the computer 54 adds the time difference e detected at the step SP6 to the jitter detection result Δr (p, b) corresponding to the front and rear pit lengths p and pit intervals b, and increments the corresponding jitter measurement number n (p, b) by the value "1". Subsequently, control of the computer 54 goes to a decision step SP9, whereat it is determined whether or not the time measurement is completed with respect to all the leading edges. If a NO is outputted at this decision step SP9, then control goes back to the step SP5.

Thus, the computer 54 repeats the procedure of the steps SP5, SP6, SP7, SP8, SP9, SP5, accumulates the jitter detection results measured at every changing pattern appearing in the reproduced signal RF and counts the number of additions. Incidentally, this changing pattern is classified by the periods of the front and rear 6 samples (whole period of the period 12T) based on the fundamental period T from the jitter detection target edge so as to correspond to the number of stages of the latch circuits 19A to 19M in the leading edge correcting circuit 17A.

After the time measurement of the jitter with respect to all edges was completed, a YES is outputted at the decision step SP9 and hence the computer 54 goes to a step SP10, wherein the time measured jitter detection results are averaged at every changing pattern appeared in the reproduced signal RF. That is, since the jitter detected at the step SP6 is affected by the influence of the noise, the computer 54 averages the jitter detection results, thereby making it possible to increase a jitter measurement accuracy.

When the computer 54 averages the jitter detection results as described above, control of the computer 54 goes to the next step SP11, wherein the correction value data DF may be generated from this detection result at every changing pattern. Here, the correction value data DF is calculated by executing the computation on the following equation (3) where τ is a delay time difference between the taps in the delay circuit 22.

$$Hr1(p, b) = Hr0(p, b) - a/\tau \cdot \Delta r (p, b) \quad (3)$$

Here, Hr1 (p, b) represents the tap of the delay circuit 22 selected by the correction value data DF, and the center tap is presented when the value is 0. Also, Hr0 (p, b) represents the tap of the delay circuit 22 selected by the correction value data DF formed of the initial value. In this embodiment, Hr0 (p, b) is set to the value 0. Further, a is the constant. In this embodiment, a is set to a value less than 1 (e.g. 0.7 etc.). Thus, even when there is an influence such as a noise or the like, correction data may be converged reliably.

When the computer 54 stores the thus generated correction value data DF in a predetermined address region of the ROM writer 55, control of the computer 54 goes to a step SP12, whereat this processing procedure is ended. Subsequently, the computer 54 executes a similar procedure with respect to different recording powers. After the above-mentioned processing is executed with respect to all powers (8 kinds of powers in which the staircase signal SF corresponds to 0 to 7), the ROM writer 55 executes the development, thereby resulting in the correction value table 20 within the leading edge correcting circuit 17A being completed.

Further, the same processing is executed with respect to the trailing edge of the digital binarized signal, thereby completing the correction value table 20 within the trailing edge correcting circuit 17B.

The optical disk is manufactured in the optical disk apparatus 1 by using the thus completed correction value table 20. In the thus completed optical disk, even when the recording power is changed stepwise in accordance with the second information SE, the pit becomes an ideal length in accordance with the change of the power so that the whole of the disk surface may be reproduced with an extremely small jitter.

While in the above-mentioned embodiment the evaluation optical disks are manufactured with respect to all recording powers of 8 stages and the correction value table is directly calculated from the reproduced signal as described above, the present invention is not limited thereto and the evaluation optical disk, for example, is limited to two kinds of different recording powers. Correction value tables of other recording powers may be formed by mathematical computation such as interpolation and extrapolation or the like.

Further, while the jitter amount is measured by the time measurement of the binarized signal based on the fundamental clock and the correction value data is generated based on this measured result as described above, the present invention is not limited thereto. When a sufficient accuracy may be maintained in actual practice, instead of the time measurement of the jitter amount by this measurement, correction value data may be generated by detecting the signal level of the reproduced signal based on the fundamental clock. In this case, an error voltage from the signal level of the detected reproduced signal to the slice level is calculated and correction value data is computed based on this error voltage and a transient response characteristic of the reproduced signal.

Further, while the timing of the modulation signal is corrected in accordance with the correction value data stored in the table as described above, the present invention is not limited thereto. When a sufficient accuracy may be maintained in actual practice, instead of the previously-detected correction value data, the correction value data may be computed by the computation processing, and the timing of the modulation signal may be corrected by the thus computed correction value data.

Incidentally, in the optical information recording apparatus according to this embodiment, the modulating circuit 4 comprises a modulation signal generating device for generating the modulation signal SB which is changed in response to the first information SA, the staircase generating circuit 7 comprises a time change signal generating device for generating the time change signal which is changed in time in accordance with the second information SE, the optical modulator 10A comprises the light amount changing device for changing the light amount of the laser in accordance with the time change signal SF, and the optical modulator 10B comprises the optical modulating device for turning on and off the laser beam L1 obtained from the light amount changing device 10A in accordance with the modulation signal SB.

The optical information recording apparatus according to this invention comprises the modulation signal generating device for generating the modulation signal which changes in response to the first information, the time change signal generating device for generating the time change signal which changes in time in accordance with the second information, the light amount changing device for changing the light amount of the laser in accordance with the time change signal and the optical modulating device for turning on and off the laser beam obtained from the light amount changing device in accordance with the modulation signal, wherein the laser light amount is changed gently by the second information. Therefore, the optical information recording apparatus according to the present invention becomes able to record the second information, which is not standardized in the standards of CD and DVD or the like, in addition to music and video information or the like (first information) standardized in the standards of CD and DVD or the like, for example. Also, the optical disk manufactured by the optical information recording apparatus according to the present invention may be reproduced stably without suddenly changing the characteristic of the reproduced signal near the changing point of the second information.

Further, the modulation signal generating device of the optical information recording apparatus according to the present invention includes the first modulation signal generating device for generating the first modulation signal by switching the signal level at the period of the integer multiple of the predetermined fundamental period in response to the first information, the change pattern detection device for detecting the change pattern of the first modulation signal and the timing correcting device for generating the second modulation signal by correcting the change timing of the first modulation signal in accordance with both of the time change signal and the change pattern, wherein the change timing of the recording signal is corrected in response to both the change of the laser light amount and the change pattern of the recording signal. Therefore, in the optical disk recorded by the optical information recording apparatus according to the present invention, its signal characteristic becomes extremely satisfactory. Also, the change amount of the light output for recording the second information may be set to be large so that it becomes possible to record the clear second information.

Further, in the optical information recording method according to the present invention, the first information is recorded by mainly turning on and off the laser beam and the second information is recorded by mainly changing the light intensity of the laser beam so that the light intensity of the laser beam is changed gently in time. Furthermore, the timing for turning on and off the laser beam is adjusted in accordance with both the first information and the light intensity of the laser beam. Therefore, the optical information recording method according to the present invention becomes able to record the second information, which is not standardized in the standards of CD and DVD or the like, in addition to music and video information or the like (first information) standardized in the standards of CD and DVD or the like, for example. Also, the change amount of the light output for recording the second information may be set to be large so that it becomes possible to record the clear second information.

Furthermore, in the optical information recording medium according to this invention, the first information is recorded by mainly changing the pit length and the pit position, and the second information is recorded by mainly changing the pit width. The pit width is changed gently by the second information. Also, the pit length and the pit position are fine adjusted by the signal patter and the pit width recorded as the pits. Therefore, it becomes possible to obtain the medium in which the second information, which is not standardized in the standards of CD and DVD or the like, is recorded in addition to music and video information or the like (first information) standardized in the standards of CD and DVD or the like, for example. If the graphic information such as characters and graphics or the like which may be visually confirmed is recorded on the signal portion of the disk as the second information, it becomes possible to obtain a disk with an increased value added. Further, the graphic information of the optical information recording medium according to the present invention may be visually confirmed more clearly as compared with the conventional method.

Having described a preferred embodiment of the invention with reference to the accompanying drawings, it is to be understood that the invention is not limited to that precise embodiment and that various changes and modifications could be effected therein by one skilled in the art without departing from the spirit or scope of the invention as defined in the appended claims.

What is claimed is:

1. An optical disk recording apparatus for recording first standard information and second information on a disk-like recording medium by a laser beam, comprising:

modulation signal generating means for generating a modulation signal which changes in response to said first standard information;

time change signal generating means for generating a time change signal which changes in accordance with said second information;

light amount changing means for changing a light amount of said laser beam in accordance with said time change signal; and optical modulating means for modulating a laser beam by turning on and off said laser beam, whose light amount is changed by said light amount changing means, in accordance with said modulation signal generating means, wherein said laser beam modulated in accordance with said optical modulating means irradiates said disk-like recording medium to thereby record said first and second informations on said disk-like recording medium within a common pit train.

2. The optical information recording apparatus as claimed in claim 1, wherein said time change signal generating means generates said time change signal so that the output voltage of said laser beam changes stepwise over time.

3. The optical information recording apparatus as claimed in claim 2, wherein said modulation signal generating means comprises:

first modulation signal generating means for generating a first modulation signal having an output pattern by switching a signal level with a period of an integer multiple of a predetermined fundamental period in response to first information;

change pattern detecting means for detecting a change in the output pattern of said first modulation signal; and timing correcting means for generating a second modulation signal by correcting and changing the timing of said first modulation signal in accordance with both said time change signal and said detected changed pattern, thereby outputting said second modulation signal.

4. The optical information recording apparatus as claimed in claim 3, wherein said timing correcting means corrects the timing of said first modulation signal such that when the information recorded on the recording medium is reproduced and binarized with a predetermined slice level, said binarized signal changes as a function of said predetermined fundamental period.

5. The optical information recording apparatus as claimed in claim 4, wherein said timing correcting means includes correction data storing means for storing correction data determined as a function of data reproduced from an evaluation recording medium, said correction data being used by said timing correcting means to correct a timing of said first modulation signal.

6. The optical information recording apparatus as claimed in claim 5, wherein, said correction data is further determined by an interpolation of the data reproduced from said evaluation recording medium.

7. An optical information recording method in which a laser beam is modulated optically to irradiate an optical recording medium and thereby record first information and second information as pits, comprising the steps of:

generating a modulation signal which changes in response to said first information;

recording said first information by modulating a laser beam by turning said laser beam on and off in accordance with said modulation signal;

generating a time change signal which changes in accordance with said second information; and recording said second information by changing a light intensity of said laser beam in accordance with said time change signal so that the light intensity of said laser beam changes slowly over a period of times;

thereby recording said first and second information on said optical recording medium within a common pit train.

8. The optical information recording method as claimed in claim 7, wherein the timing at which said laser beam is turned on and off is adjusted as a function of both said first information and said light intensity of said laser beam.

9. An optical information recording medium in which first and second informations are recorded as a common pit train formed of a pattern of pits having length, width and position on the recording medium, said information being read out by irradiating said pit train with a laser beam, said optical information recording medium being structured so that said first information is recorded by changing the length and position of at least one pit in said pit train by modulating a laser beam by turning said laser beam on and off in accordance with a modulation signal which changes in accordance with said first information, and said second information is recorded by changing the width of said at least one pit in said pit train in a stepwise manner by changing a light intensity of said laser beam in accordance with a time change signal, which changes in accordance with said second information, so that the light intensity of said laser beam changes slowly over a period of time.

10. The optical information recording medium as claimed in claim 9, wherein the length and the position of said at least one pit are finely adjusted as a function of the length of said at least one pit, the patterns of pits recorded ahead of and behind said at least one pit and the width of said at least one pit.

11. The optical information recording medium as claimed in claim 10, wherein said second information is recognized as two-dimensional image information when said optical information recording medium is looked at visually.

* * * * *